United States Patent
Wallace, Jr.

[15] 3,699,255
[45] Oct. 17, 1972

[54] METHOD AND APPARATUS FOR MEASURING SPEED-ERROR IN A PULSE TRAIN

[72] Inventor: Jacob L. Wallace, Jr., Springfield, Va.

[73] Assignee: The Susquehanna Corporation, Fairfax County, Va.

[22] Filed: June 24, 1970

[21] Appl. No.: 49,365

[52] U.S. Cl. ............................178/69 M, 178/69 A
[51] Int. Cl. ...............................................H04l 25/02
[58] Field of Search ...179/175.2 A; 178/69 A, 69 M; 328/134, 141

[56] References Cited

UNITED STATES PATENTS

| | | | |
|---|---|---|---|
| 3,599,014 | 8/1971 | Carp | 328/141 |
| 3,585,508 | 6/1971 | Crowther | 328/134 |
| 3,136,900 | 6/1964 | Bell | 328/134 |
| 2,732,441 | 1/1956 | Gatzert | 179/175.2 A |
| 3,243,526 | 3/1966 | La Barge et al | 179/175.2 A |
| 2,435,258 | 2/1948 | Wilder | 178/69 A |
| 2,857,484 | 10/1958 | Culbertson | 179/175.2 A |
| 3,189,733 | 6/1965 | Cannon et al | 178/69 A |
| 3,420,950 | 1/1969 | Britt | 178/69 A |

Primary Examiner—Kathleen H. Claffy
Assistant Examiner—Douglas W. Olms
Attorney—Martha L. Ross

[57] ABSTRACT

A measurement of transmission speed-error can be obtained by utilizing the present inventive concepts with conventional pulse or telegraph distortion measuring apparatus. For each character in the pulse train fed to the apparatus, a period of time is established for making measurements. The transitions which occur during this time period are measured in the normal manner and displayed. The meter or other display apparatus is designed to divide the reading by an appropriate number in order to compensate for the cumulative effect of speed error, and an indication is also made as to whether the speed is faster or slower than normal.

15 Claims, 2 Drawing Figures

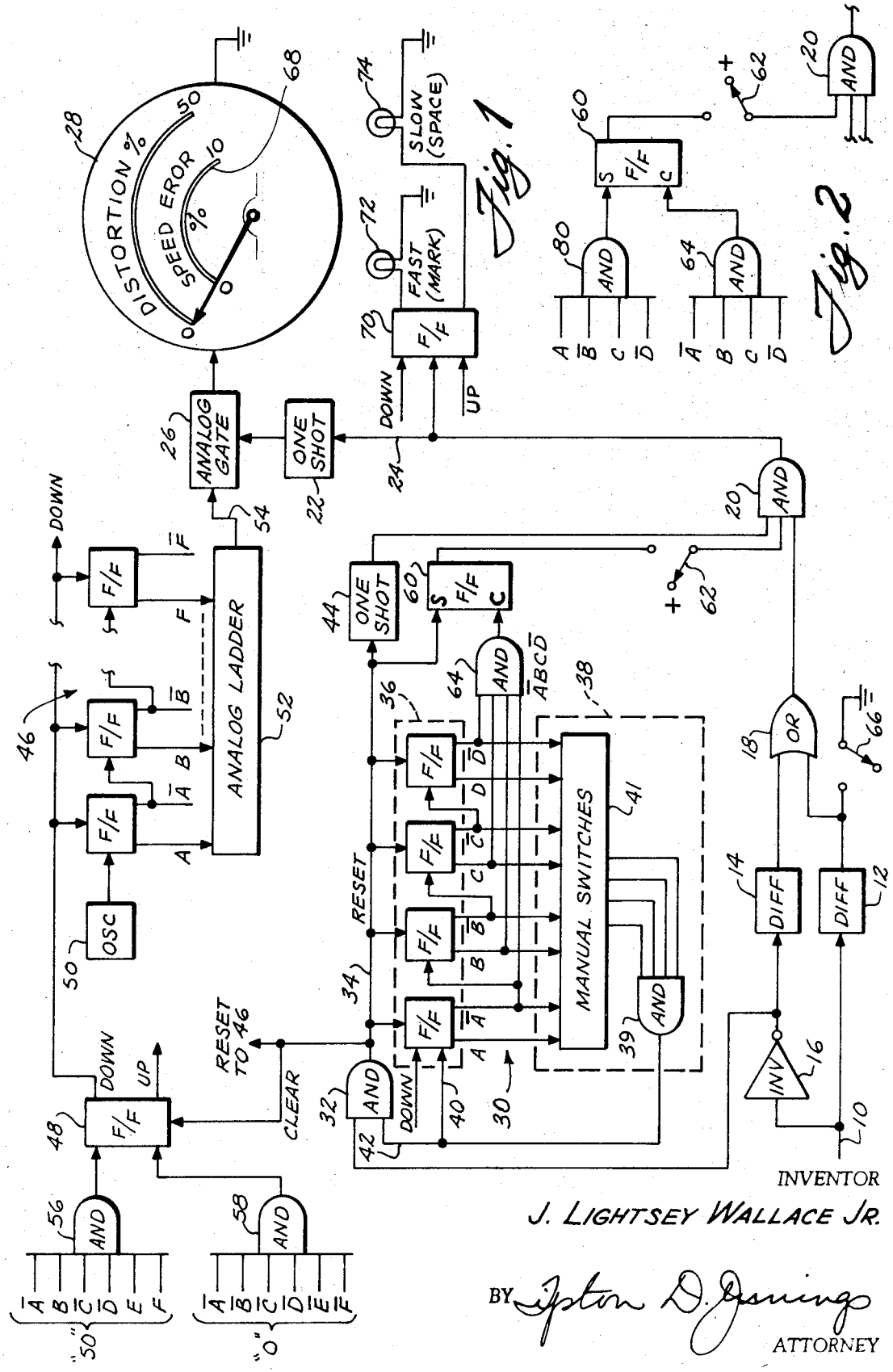

METHOD AND APPARATUS FOR MEASURING SPEED-ERROR IN A PULSE TRAIN

BACKGROUND OF THE INVENTION

The present invention relates to apparatus and process for measuring transmission speed-error in data pulse and telegraph systems.

In the measurement of distortion of pulse trains, it is convenient to divide such distortion into four types, namely, marking bias, spacing bias, spacing end distortion, and marking end distortion. Any of these types or combinations of these types can be introduced into a telegraph signal, for example, by some asymmetrical conditions such as voltage imbalance, improper relay adjustment, or changes in the received signal strength which may cause all marks to be either too long or too short.

By "marking bias" is meant that the space-to-mark transition of each marking pulse in a start-stop telegraph signal has been advanced with respect to the normal space-to-mark transition. In like manner, the term "spacing bias" designates a condition wherein the space-to-mark transition of each marking pulse is retarded with respect to the normal space-to-mark transition. The term "marking end distortion" refers to a condition where the mark-to-space transition of each marking pulse in a signal is retarded with respect to the normal mark-to-space transition. Conversely, the term "spacing end distortion" indicates a condition wherein the mark-to-space transition of each marking pulse in a signal is advanced with respect to the normal mark-to-space transition. Distortion testing apparatus of a wide variety has been developed and used to measure distortion in telegraph and data pulse signals. Examples are to be found in such patents as U. S. Pat. Nos. 3,025,349 and 3,420,950.

When distortion measurements are being made, it is customary to adjust or condition the apparatus in relation to the speed of the input signals being examined so that the measuring circuitry will give accurate readings of any distortion encountered at that input speed. In the state-of-the-art apparatus, it has been found that the measuring and indicating circuitry is susceptible to giving erroneous distortion readings when the input speed varies from the standard to which the apparatus has been set. Consequently, the input signals being analyzed appear to be distorted when what is really the problem is that the speed is incorrect. As a result, unless the person who is making the measurement can analyze the true cause of the problem, attempts will be made to locate or solve the causes of this apparent distortion when what is really needed is merely to have the transmission speed corrected. Likewise, if there is distortion on the line as well as a speed-error, then the distortion reading will be greater or less than the true reading, lending further to the problem.

SUMMARY OF THE INVENTION

The present invention overcomes the problems of the prior art by providing a speed-error measuring and indicating circuit which enables the maintenance man or other person involved in system operation to identify the presence and amount of speed-error in the signals being transmitted through the system and thereby account for them in making distortion measurements, as well as attending to locating and correcting the cause of the speed-error.

Briefly, process and apparatus are disclosed for establishing a period of time during which speed-error measurements are to be made. Any transitions which occur during this time period generate a measurement which is displayed as speed-error together with an indication whether the speed is faster or slower than normal.

BRIEF DESCRIPTION OF THE DRAWING

Other objects and advantages will become apparent from a reading of the following specification in conjunction with the drawing in which:

FIG. 1 includes a representation of the preferred embodiment of the invention in conjunction with pulse distortion measurement apparatus; and FIG. 2 is an alternative embodiment of one feature of the present invention.

DESCRIPTION OF THE PREFERRED EMBODIMENT

Referring to FIG. 1, the combined block and logic diagram discloses, in part, conventional pulse distortion testing apparatus for use by personnel in testing coded signals in the form of pulse trains, such as start-stop and synchronous telegraph signals, in order to ascertain if distortion in the signal is occurring and, if so, to measure and indicate the amount and the type of this distortion. In start-stop telegraph circuits, which will be referred to as a convenience in describing this apparatus, the coded information is grouped into characters. Each character is represented by a start pulse (spacing) of unit length followed by a number of information mark or space unit pulses and then a stop pulse (marking) which may be of unit pulse length or longer. The code level determines the number of information pulses in the character. In five-level, six-level, seven-level, and eight-level code, there are respectively five, six, seven, and eight information pulses bracketed between the start and stop pulses in a character.

The incoming telegraph signals are applied on line 10 into the apparatus shown in FIG. 1. If desired, suitable input shaping and filter circuits can be included for squaring the input pulses and eliminating undesired transients. The input waveform will alternate between mark and space conditions in accordance with the code format of the characters being transmitted, and thus both mark-to-space and space-to-mark transitions will occur. The space-to-mark transitions are differentiated by differentiator 12 while the mark-to-space transitions are differentiated at 14 after passing through inverter 16. It is these actual transitions which are utilized in determining whether distortion occurs. In the "start-stop" apparatus shown, all measurements are referenced to the initial mark-to-space transition which signals the initiation of the start of a character.

In routine measurements of pulse distortion, the differentiated output at either differentiator 12 or 14 passes through OR gate 18 and is applied to AND gate 20. Normally, this AND gate is enabled permitting the spike from OR gate 18 essentially to pass through the gate 20 to actuate one-shot 22 via line 24. This one-shot is triggered into its unstable state for approximately 15 microseconds. During this time, gate 26 is opened to permit the current appearing at its input to pass through and actuate distortion meter 28. If any actual transition in the input signal occurs at other than an ideal transition point for the pulses in the character being examined at that time, then the pointer of meter 28 will be deflected in proportion to the applied current to indicate accurately the percentage distortion. By means of a capacitor (not shown) or other conventional circuitry, the meter reading can be held at its highest value.

Because the start-stop telegraph signals are transmitted as distinct characters, a separate timing period is provided for each character during which period distortion measurements occur. This timing period is controlled by a character timer indicated generally at 30. This timer 30 is shown constructed as a binary counter 36 which is designed to count to a predetermined count, based upon the code level of the input signal, so that the timing cycle will terminate during the stop pulse of each incoming character being measured for distortion.

In operation, the mark-to-space transition of the start pulse of a character is applied from the output of inverter 16 to AND gate 32. This transition finds AND gate 32 enabled, and it passes to line 34 to reset all of the flip-flops in counter 36. Counter 36 is reset to a zero count, and the decoder block 38 now functions to remove the clamp on line 40 so that counting can begin. Through line 42, decoder 38 also acts to inhibit the passage of further transitions through AND gate 32 during the remainder of the timing cycle.

Decoder 38 can be a conventional binary-coded-decimal to decimal decoder having a plurality of AND gates (not shown) whose input lines are selected ones of the complementary outputs of the flip-flops of counter 36. Alternatively, decoder 38 can suffice as one AND gate 39, as shown, accompanied by a manual switch bank 41 at its input to connect the desired output lines of counter 36. The purpose of this is to provide variable timing periods for the character timer 30 because the distortion measuring apparatus must accommodate telegraph signals of different code levels. Thus, when the signals contain five-level telegraph characters, the timing cycle will obviously be shorter than when the telegraph signals are composed of six- or eight-level characters. In any event, the decoder 38 functions to control the counting cycle by permitting counting to begin upon receipt of the start transition and terminating counting in counter 36 usually during the stop pulse, when the count has reached a predetermined value in accordance with the known level of the input signal.

The start transition is also applied to one-shot 44 to actuate this one-shot and thereby disable AND gate 20 to prevent the passage of the start transition. Accordingly, the start transition, which is used as the reference point in the making of distortion measurements, is not itself measured for distortion.

The start transition is also applied as a reset signal to reset to zero the binary counter indicated generally at 46. Binary counter 46 is composed of a chain of flip-flops which are designed as an up/down counter. Flip-flop 48 controls the direction, that is, either up or down, of this counter. The counter 46 is driven by pulses emitted from oscillator 50 which has a frequency of 100 times the Baud rate of the telegraph signals being measured. Oscillator 50 is preferably variable in order to obtain a variety of output frequencies whose selection is dependent upon the speed of the input signals.

Beginning with the start transition, the pulses from the oscillator 50 are continuously counted by counter 46, every one-hundredth pulse establishing the end of an ideal pulse period known as the ideal pulse point or ideal transition point. For the first half of an ideal pulse period, flip-flop 48 is clear so that counter 46 counts upwardly from zero to the count of fifty; and during the second half of the ideal pulse period, flip-flop 48 is set so that the counter 46 counts down from the level of 50 to 0. The down line of flip-flop 48 is shown as being coupled into the flip-flop stages of counter 46 in order to effect this directional control.

Flip-flop 48 is controlled, in turn, by two decoder circuits connected to selected outputs of the flip-flop stages of counter 46. These decoders are shown as two AND gates 56 and 58. During the upward count when the count reaches fifty, all inputs to AND gate 56 become true; and an output is applied to set the flip-flop 48. The "down" line now becomes active to steer input pulses to the flip-flop stages such that the count progresses downwardly from 50 to 0. At the count of 0, which signifies the ideal pulse or transition point, all inputs to AND gate 58 are now true; and flip-flop 48 is cleared. The signal is removed from the down line, and the count direction again reverses so that the count will progress from 0 back towards 50 as the input pulses are steered to effect an upward count.

Although the counter 46 is digital in design, its output is converted to a current analog by means of analog ladder 52, which functions as a digital-to-analog converter, and which is connected to the normal output line of the counter. The output current of ladder 52 is proportional to the count in counter 46 and steps up (or down, as the case may be) to a new current level for each new count in counter 46. The output of analog ladder 52 is applied by line 54 to analog gate 26, which is opened, as previously described, by one-shot 22 in response to actual transitions in the incoming signals.

The output current of ladder 52 during each ideal pulse period is actually an ascending and descending staircase which begins at a zero value initially at the start transition and subsequently at each ideal pulse point, and steps up to a maximum at each one-half ideal pulse point and then steps down again to 0 at each ideal pulse point. Each step in the staircase occurs in response to a pulse from oscillator 50 being counted in counter 46. Ladder 52 is conventional in construction and preferably contains weighted resistors (not shown) which are switched into circuit by the outputs from the flip-flops of counter 46 so that the staircase current waveform can be effected.

Because the output current of ladder 52 is 0 at each ideal transition point, no current flows through gate 26 when opened by one-shot 22 in response to the arrival of an actual transition at that time. A zero distortion measurement will register on meter 28. On the other hand, if an actual transition occurs at other than an ideal transition point, then a current will flow through open gate 54 to distortion meter 28 and present a reading in percent distortion based upon how early or late the actual transition preceded or followed the ideal transition point.

The drive pulses for character timer 36 are taken from the "down" line of flip-flop 48. The first pulse is applied to counter 36 half way through the start pulse and thereafter at each ideal half-pulse point. Thus, for a five-level code, counter 36 is preferably designed to count seven input pulses from flip-flop 48 during the timing cycle, the seventh pulse occurring when the input character is in the stop element. The arrival of the seventh pulse will cause AND gate 39 in decoder 38 to block further advancing of counter 36 by the application of a clamp on line 40. The timing period is now ended. Similarly, for a six-level input signal, counter 36 will preferably attain a count of 8 during the timing cycle; and for an eight-level input signal, counter 36 will attain a count of 10 during the timing cycle. At the end of the timing period, AND gate 32 is enabled by the signal on line 42 and is thus conditioned to pass the next start transition.

In summary, it has been shown that the arrival of the start pulse initiates a timing period during which ideal pulse points are established with reference to the start transition. Thereafter, if any actual transition in the incoming character is displaced with reference to its ideal pulse point, an indication of distortion will occur.

The problem with state-of-the-art distortion measuring apparatus, such as described above, is that it is susceptible to making erroneous distortion readings in response to transmission speed errors. For example, assume the case where the actual transitions coincide with the ideal transition points and there is no distortion present. Assume now that a 2% increase in the speed of transmission occurs through some fault in the transmitting apparatus or frequency translation in the communications line. When the next character is applied to the measuring circuit, the start transition will reset the apparatus, as described previously. Now, if a transition occurs at the beginning of the first information pulse, it will precede the ideal transition point by an amount equal to 2% of the unit pulse length. This transition will pass through OR gate 18, AND gate 20, and trigger one-shot 22. Gate 26 will open, and the current at the output of ladder 52 will flow through gate 26 to indicate 2% distortion. If another transition should occur at the end of the first information pulse, it will be displaced 2% due to the speed error plus the 2% error of the first transition, or a total of 4%; and the meter 28 will now read 4% distortion in view of the increased current applied through gate 26. In other words, speed error is cumulative from transition to transition. Thus, if a transition occurs at the start of the fifth information pulse and there is 2% speed error, then the meter will show a 10% distortion reading.

Similarly, if the speed error is caused by a decrease in speed, the actual transitions will occur after the ideal transitions; but in any event, each time gate 26 opens, current will flow from ladder 52 into meter 28 to give a distortion reading. Thus, what appears to be distortion in the line is nothing more than speed error. Ideally, the cause of the speed error is readily corrected or the reading taken into account, provided the maintenance man or whoever is operating the equipment knows the transmission speed is wrong. However, what ordinarily happens is that the distortion reading is noted and some attempt made to pinpoint or identify the source of this apparent distortion. The end result is that corrective action is now proceeding in the wrong direction, adding to increased maintenance and operating costs plus the inconvenience of any attendant delays or shut-downs.

As a solution to the problems which speed-errors have caused in the past, attention is again invited to FIG. 1 which shows the improvement of the present invention. AND gate 20 is here shown as being provided with a third input. During normal distortion measurements as described above, this third input is kept at an enabling potential by switch 62. During speed-error measurements, this switch is closed to complete the line from the output of a flip-flop 60 so that AND gate 20 is now controlled by this flip-flop.

Flip-flop 60 is set by the start transition on line 34. The clear input is connected to a decoder circuit, here shown as an AND gate 64. The inputs to AND gate 64 are taken from the output lines of the flip-flops of counter 36, and are identified logically as $\bar{A}$ B C $\bar{D}$. When counter 36 attains the count of six, these four lines become true to clear the flip-flop 60 and thereby disable AND gate 20. In counter 36, the count of six is attained during the character timing cycle at a point in time halfway through the fifth information pulse. This, therefore, provides for the occurrence of five ideal transition points following the start transition; and accordingly, up to five actual transitions can be examined for speed-error during this time period.

Assume now that speed-error measurements are to be taken. At the input, switch 66 is moved from its normal position to a position that grounds the output of differentiator 12 to apply a constant ground to one input of OR gate 18. By this means, only space-to-mark transitions will be examined during the speed-error measurements. This arrangement is preferred because of the synchronization of the measurement cycle with the space-to-mark transition of the start pulse, and it also serves to eliminate the effect of any bias distortion that may be present.

In operation, the start transition in the character again passes through AND gate 32 to reset counter 36 to begin the character timing cycle and counter 46 and flip-flop 48 to begin the up/down count cycles for the speed-error measurements. One-shot 44 is again actuated to prevent the passage of the start transition through AND gate 20 into the measuring circuitry. This one-shot times out shortly thereafter to again apply a true input to AND gate 20. Flip-flop 60 is set by the start transition; and with switch 62 now closed, a true input is applied on the output line from flip-flop 60 into AND gate 20. This AND gate is now conditioned to pass actual transitions out of OR gate 18.

For each character in the coded input signals being applied, the likelihood is that there will be at least one and possibly several space-to-mark transitions in each character. When any such transition does occur, it is inverted at 16, differentiated at 14, and the resultant spike passed through OR gate 18 to AND gate 20. Finding this AND gate enabled, this spike passes through and triggers one-shot 22. Gate 26 now opens briefly; and if the actual transition has not coincided with an ideal transition, ladder output current appears on line 54 and is fed to meter 28. A reading is effected. Each time a transition causes the current at the meter to exceed that caused by the earlier transition, the meter pointer will deflect further to give a higher reading in proportion to that current.

As can be seen, meter 28 has a second scale identified by character 68 and labeled "Speed-Error". As explained above, speed-error is cumulative; and some provision must be made to indicate true speed-error. Here, the speed scale is preferably designed to have its indications read a fraction of those found on the distortion scale. As can be seen, the 50% maximum on the distortion scale is only a 10% maximum on the speed scale. In effect, then, the meter face is here used to divide the reading by 5. The divisor "5" is chosen because flip-flop 60 will permit a maximum of five actual transitions to pass through AND gate 20 (following the start pulse) during the speed-error measurement period.

The speed-error measurement period ends when the count of 6 is reached in character timer 36. Flip-flop 60 is cleared by the output of AND gate 64. A false input is applied to AND gate 20, and no further transitions can pass until the start transition in the next successive character again sets flip-flop 60.

It is likely that the meter 28 may not attain its full speed-error reading in the duration of one character. Normally, it requires the receipt of several characters before a full reading is attained. The meter pointer is usually seen to rise in a quick step fashion to its maximum reading where it is held by conventional holding circuitry. The maximum reading is attained once a space-to-mark transition occurs at the fifth information pulse. Even at the slowest transmission speeds encountered in data pulse and telegraph transmissions, the full reading will be reached easily in one second's time and generally much less.

In order to know whether the speed-error is caused by an input speed which is too fast or too slow, an additional flip-flop 70 is provided. The flip-flop is toggled by the output of AND gate 20 and is steered by the "down" and "up" outputs of flip-flop 48. If the input speed is faster than prescribed, counter 46 will be counting down when actual transitions occur, and the down line out of flip-flop 48 will be true. Each actual transition is steered to the set input of flip-flop 70 causing lamp 72 to become illuminated. This lamp is labeled "Fast". On the other hand, if the speed-error is slower than prescribed, then the actual transitions occur during the up cycle of counter 46, and the "up" line out of flip-flop 48 will be true. The transitions out of gate 20 are steered to the clear side of flip-flop 70, and the "Slow" lamp 74 will become illuminated. Thus, by examining the meter 28 and the lamps 72 and 74 during the speed-error readings, the maintenance man can ascertain the amount of error and whether that error is caused by a signal that is faster or slower than prescribed. Note also that these lamps can be used to indicate whether or not during distortion readings the distortion is marking bias or spacing bias because the same counting condition of counter 46 will apply as for fast/slow measurements of speed-error.

In summary, distortion measuring apparatus has been improved by providing for a direct reading of speed-error in the input signals. By the circuitry shown and described, a predetermined portion of the timing cycle is used for making speed-error measurements. The circuit is designed to accommodate all code levels such as five-, six-, seven-, or eight-level codes without any change in circuitry. The meter also takes into account the recognition that speed-error is a cumulative quantity which must be processed to give a true reading.

An alternative arrangement is shown in FIG. 2 for making speed-error measurements. Here, the circuit is designed to measure only one transition in each character. As shown, the set input of flip-flop 60 is no longer connected to line 34. Instead, a second AND gate 80, which also functions as a decoder, is used in the control of this flip-flop. AND gate 80 is connected to the $\overline{A}\,B\,C\,\overline{D}$ outputs of counter 36.

In operation, with switch 62 closed and the apparatus conditioned to making speed-error measurements, flip-flop 60 is clear. No actual transition can yet pass through AND gate 20. When the count of five is reached in counter 36, which occurs half-way through the fourth information pulse of the character, all inputs to AND gate 80 go true, and its output sets flip-flop 60. AND gate 20 is enabled. Half-way through the fifth information pulse, all inputs to AND gate 64 go true, and flip-flop 60 is cleared. Gate 20 is again disabled. Thus, AND gate 20 is enabled for a period of time equal to one ideal pulse length. Only one mark-to-space transition can occur during this period; and if it does occur, it will pass through gate 20 to trigger one-shot 22 and effect a speed-error measurement. The meter 28 will again display a true reading of speed-error. In practice, it may require that several characters be examined before a mark-to-space transition is found at the beginning of the fifth information pulse, but the speed of transmission is such that the time of one second or less is generally all the time required before deflection of the meter pointer is noted.

Although the description of the two embodiments presented above have described measurements which ended after the transition of the fifth information pulse, it should now become apparent that the time period for speed-error measurements can be designed to end on other transitions, and have different durations as well. For example, in FIG. 2, AND gate 80 can be opened half-way through the third information pulse and closed half-way through the fourth, or half-way through the fifth as desired. Measurement of speed-error is then made at the fourth transition or at the fourth and fifth transitions, respectively. With regard to FIG. 1, AND gate 60 can be designed to close after any transition, including the start of the eighth information pulse when an eight-level code is used. In all cases, appropriate modification of the meter face or reading is necessary in order to accommodate the cumulative effect of speed-error. Alternatively, provision can be made to divide the pulse count or analog current before presentation, or reduce the generation frequency of counting pulses.

It will be apparent that various modifications may be made to the disclosed apparatus within the spirit of the scope of the invention; and it is desired, therefore, that only such limitations be placed on the invention as are imposed by the prior art and set forth in the appended claims.

What is claimed is:

1. A method for making measurements of speed-error in pulse train transmissions comprising:
   1. establishing a period of time for measuring speed-error during which at least one pulse transition can be measured, including:

a. initiating said period of time in response to an initially received pulse in the pulse train, and
b. terminating said period of time after the passage of a preset interval subsequent to the initiation of said period of time,
2. comparing during the established time period the times of arrival of pulse transitions in the pulse train with the respective ideal times of arrival for such transitions,
3. displaying any difference in time between the receipt of any such transition and its respective ideal time of arrival as a measurement of transmission speed-error, and
4. indicating whether said error in transmission speed is fast or slow with respect to normal speed.

2. A method as claimed in claim 1 in which said period of time is established for comparing more than the time of arrival of one transition.

3. A method as claimed in claim 2 wherein said period of time is initiated upon receipt of said initially received pulse.

4. A method as claimed in claim 3 further comprising the step of inhibiting the first transition received during said period of time from said comparison step.

5. A method as claimed in claim 4 further comprising the steps of:
1. utilizing a meter to display the measurement in speed-error percentage,
2. providing a scale on said meter graduated to divide the measurement by the maximum number of transitions, other than the first transition, which can be contained in the pulse train during said period of time.

6. A method as claimed in claim 4 wherein the pulse train transmissions are grouped into characters and said period of time is initiated upon receipt of the first transition of each character in the pulse train and is terminated prior to the end of said character.

7. A method as claimed in claim 1 wherein said period of time is initiated at a preset time subsequent to receipt of said initially received pulse.

8. A method as claimed in claim 7 in which said period of time is established for comparing no more than the time of arrival of one transition.

9. A method as claimed in claim 8 in which said displaying step includes dividing any measurement of time difference by the numerical position of said transition with reference to a start transition.

10. Apparatus for measuring errors in the speed of transmission of pulse trains comprising:
1. means for establishing a period of time during which measurements of at least one pulse transition are to be made, including:
a. means for initiating said period of time in response to an initially-received pulse in a pulse train, and
b. means for terminating said period of time after the passage of a preset interval subsequent to the initiation of said period of time,
2. means for effecting measurements during said period of time including means for receiving transitions in the pulse trains and comparing the times of arrival of such transitions with their respective ideal times of arrival,
3. means for displaying said measurements as a fraction of their value, and
4. means responsive to the receipt of said transitions for indicating whether the displayed measurements are faster or slower than the normal speed.

11. Apparatus as claimed in claim 10 in which said establishing means comprises:
1. a gate for passing selected transitions during said time period, and
2. a flip-flop for controlling said gate and thereby the passage of said transitions.

12. Apparatus as claimed in claim 11 in which said initiating means includes:
1. means for setting said flip-flop in response to an initial transition in said pulse train,
and said terminating means includes:
2. a counter, and
3. means for clearing said flip-flop in response to said counter attaining a predetermined level.

13. Apparatus as claimed in claim 11 in which said establishing means further includes:
1. a counter, said initiating means includes:
2. means for setting said flip-flop in response to said counter attaining a first predetermined level, and
said terminating means includes:
3. means for clearing said flip-flop in response to said counter attaining a second predetermined level.

14. Apparatus as claimed in claim 10 further comprising means responsive to said initially received pulse in a pulse train for generating signals corresponding to the ideal times of arrival for the transitions in such pulse train.

15. Apparatus as claimed in claim 14 in which said displaying means comprises:
1. a meter,
2. a face for said meter,
3. said face being graduated to display said measurements as a fraction of their measured value.

* * * * *